US007626348B2

(12) United States Patent
Cartier et al.

(10) Patent No.: US 7,626,348 B2
(45) Date of Patent: Dec. 1, 2009

(54) LINEAR MOTOR DOOR ACTUATOR

(75) Inventors: Paul Cartier, La Pocatière (CA); Martin Lebel, La Pocatière (CA); Eric Martin Dubé, Saint-Bruno-de-Kamouraska (CA)

(73) Assignee: Technologies Lanka Inc., La Pocatière (Québec)

( * ) Notice: Subject to any disclaimer, the term of this patent is extended or adjusted under 35 U.S.C. 154(b) by 715 days.

(21) Appl. No.: 11/442,251

(22) Filed: May 30, 2006

(65) Prior Publication Data

US 2007/0278977 A1 Dec. 6, 2007

(51) Int. Cl.
*H02P 1/00* (2006.01)

(52) U.S. Cl. .................. 318/135; 318/400.14; 318/683; 318/687

(58) Field of Classification Search ................. 318/135, 318/400.14, 400.38, 671, 683, 687
See application file for complete search history.

(56) References Cited

U.S. PATENT DOCUMENTS

| | | | | |
|---|---|---|---|---|
| 3,456,136 | A | 7/1969 | Pierro | |
| 3,549,966 | A | 12/1970 | Wilson | |
| 3,638,093 | A | 1/1972 | Ross | |
| 3,721,874 | A | 3/1973 | Pelenc et al. | |
| 3,736,880 | A | 6/1973 | Ross | |
| 3,787,716 | A | 1/1974 | La France | |
| 3,904,941 | A * | 9/1975 | Matsui et al. | 318/135 |
| 4,381,478 | A * | 4/1983 | Saijo et al. | 318/135 |
| 4,641,065 | A | 2/1987 | Shibuki et al. | |
| 4,698,576 | A * | 10/1987 | Maresca | 318/687 |
| 4,772,837 | A | 9/1988 | MacMunn | |
| 4,839,543 | A | 6/1989 | Beakley et al. | |
| 4,840,125 | A | 6/1989 | Lueers | |
| 4,853,602 | A | 8/1989 | Hommes et al. | |
| 4,908,533 | A | 3/1990 | Karita et al. | |
| 4,933,608 | A | 6/1990 | Ohhama | |
| 4,935,676 | A | 6/1990 | Pelta | |

(Continued)

FOREIGN PATENT DOCUMENTS

JP 58-043171 3/1983

(Continued)

OTHER PUBLICATIONS

Niitech Co., Ltd., www.niitech.co.jp/en/housing/lineardoor.html.

(Continued)

*Primary Examiner*—Bentsu Ro
*Assistant Examiner*—Thai Dinh
(74) *Attorney, Agent, or Firm*—Ogilvy Renault, LLP

(57) ABSTRACT

The present invention relates to an alternating current electrical motor having a first element with magnets of alternating polarities, and a second element with electrical conductor coils, the first and the second elements being mounted for relative motion to one another. A controller for the electrical motor comprising: a current source for energizing the coils with an alternating current to produce a movement of the first and the second elements relative to one another; a sensor for sensing a phase shift between the magnets and the current in the coils; and a current source controller for varying an amplitude of the current to substantially regulate the phase shift to an optimum phase shift value, thereby providing a minimum power consumption for proper operation of the electrical motor.

30 Claims, 10 Drawing Sheets

U.S. PATENT DOCUMENTS

| | | | | |
|---|---|---|---|---|
| 5,066,897 | A | 11/1991 | Ueda et al. | |
| 5,172,518 | A | 12/1992 | Yoshino | |
| 5,208,496 | A | 5/1993 | Tozoni et al. | |
| 5,218,282 | A | 6/1993 | Duhame | |
| 5,225,725 | A | 7/1993 | Shiraki et al. | |
| 5,280,222 | A | 1/1994 | Von Der Heide et al. | |
| 5,289,088 | A | 2/1994 | Andoh | |
| RE34,674 | E | 7/1994 | Bleakley et al. | |
| 5,605,100 | A * | 2/1997 | Morris et al. | 104/284 |
| 5,701,042 | A | 12/1997 | Takei | |
| 5,747,952 | A | 5/1998 | Izawa et al. | |
| 5,801,462 | A | 9/1998 | Yagoto et al. | |
| 5,973,459 | A | 10/1999 | Itoh | |
| 5,977,664 | A | 11/1999 | Chitayat | |
| 6,011,367 | A | 1/2000 | Oedl et al. | |
| 6,046,555 | A | 4/2000 | Szoboszlay | |
| 6,097,114 | A | 8/2000 | Hazelton | |
| 6,163,091 | A | 12/2000 | Wasson et al. | |
| 6,411,049 | B1 | 6/2002 | Fischperer | |
| 6,455,957 | B1 | 9/2002 | Chitayat | |
| 6,586,898 | B2 | 7/2003 | King et al. | |
| 6,590,355 | B1 | 7/2003 | Kikuchi et al. | |
| 6,614,200 | B2 | 9/2003 | Fowler et al. | |
| 6,703,805 | B2 | 3/2004 | Griffitts | |
| 6,705,408 | B2 | 3/2004 | Kim et al. | |
| 6,713,902 | B2 | 3/2004 | Chitayat | |
| 6,753,633 | B1 | 6/2004 | Eberle | |
| 6,803,681 | B2 | 10/2004 | Faizullabhoy et al. | |
| 6,806,664 | B2 | 10/2004 | Beishline | |
| 6,825,582 | B2 | 11/2004 | Hehl | |
| 6,876,105 | B1 | 4/2005 | Faizullabhoy et al. | |
| 6,876,896 | B1 | 4/2005 | Ortiz et al. | |
| 6,917,126 | B2 | 7/2005 | Tsuboi et al. | |
| 6,952,086 | B1 | 10/2005 | Krefta et al. | |
| 6,963,148 | B1 | 11/2005 | Faizullabhoy et al. | |
| 6,975,081 | B1 | 12/2005 | Faizullabhoy et al. | |
| 6,983,701 | B2 | 1/2006 | Thornton et al. | |
| 6,984,945 | B2 | 1/2006 | Sato | |
| 6,995,528 | B2 | 2/2006 | Sato | |

FOREIGN PATENT DOCUMENTS

WO WO 2005/088812 9/2005

OTHER PUBLICATIONS

Fuji Electric Systems Co., Ltd., www.fesys.co.jp/sougou/seihin/p16/pdf/WC31-13a.pdf.
Temposonics LK Embeddable Sensors, OEM Integrator's Manual, MTS Systems Corporation, Cary, NC, 27513.
Igus DryLin R, www.igus.com.

* cited by examiner

LINEAR MOTOR DOOR ACTUATOR

TECHNICAL FIELD

The invention relates to electrical motors. More particularly, the invention relates to linear motor actuators for sliding panels.

BACKGROUND

Actuators are used to automatically open and close doors in subway cars, passenger trains, supermarket entrances, elevators, etc. Examples of such actuators are basically pneumatic cylinders, ball screws coupled to an electric motor, straps coupled to an electric motor or a linear motor that moves the door, opening and closing it, and that is able to detect an obstruction of the door.

One drawback associated with these actuators is that they need maintenance, adjustments and lubrication. There is also a problem associated with obstruction detection, which is normally achieved using a sensitive edge and which also needs maintenance and adjustments. In the case of a linear motor actuator, one other problem is the high power consumption.

SUMMARY

One aspect of the invention provides a method of controlling an electrical motor for minimizing its power consumption. The motor has a first element with magnets of alternating polarities, and a second element with electrical conductor coils, the first and the second elements being mounted for relative motion to one another. The method comprises the steps of: energizing the coils with an alternating current to produce a movement of said first and said second elements relative to one another, said alternating current having an amplitude, a frequency and a phase; sensing a physical quantity representative of a phase shift between said magnets and said current in said coils; substantially maintaining said phase shift to an optimum phase shift by varying at least one of said amplitude, said frequency and said phase; and varying said amplitude such that a minimum amplitude is provided and a power consumption of said electrical motor is minimized.

Another aspect of the invention provides an electrical motor controller for minimizing power consumption in an electrical motor having a first element with magnets of alternating polarities, and a second element with electrical conductor coils. The first and the second elements being mounted for relative motion to one another. The controller comprising: a current source for energizing the coils with an alternating current to produce a movement of the first and the second elements relative to one another, the alternating current having an amplitude, a frequency and a phase; a sensor for sensing a physical quantity representative of a phase shift between the magnets and the current in the coils; and a current source controller for substantially maintaining the phase shift to an optimum phase shift, the current source controller having an amplitude controller for varying the amplitude such that a minimum amplitude is provided.

Another aspect of the invention provides an alternating current electrical motor with reduced power consumption. The motor comprises: a first element having magnets disposed with alternating polarities along the motion direction of the motor; a second element mounted to the first element for relative motion to one another and having electrical conductor coils disposed along the motion direction; a current source for energizing the coils with an alternating current to produce a movement of the first and the second elements relative to one another, the alternating current having a phase, a frequency and a variable amplitude; a sensor for sensing a physical quantity representative of a phase shift between the magnets and the current in the coils; and a current source controller for substantially maintaining the phase shift to an optimum phase shift, the current source controller having an amplitude controller for varying the amplitude such that a minimum amplitude is provided.

Another aspect of the invention provides a method for detecting an obstruction in an electrical motor. The motor has a first element with magnets of alternating polarities, and a second element with electrical conductor coils. The first and the second elements are mounted for relative motion to one another. The method comprises the steps of: energizing the coils with an alternating current to produce a movement of the first and the second elements relative to one another; sensing a physical quantity representative of a phase shift between the magnets and the current in the coils; and detecting a presence of an obstruction condition when a value of the phase shift is greater than a phase shift limit value and a value of the amplitude of the current is greater than an amplitude limit value.

BRIEF DESCRIPTION OF THE DRAWINGS

Further features and advantages of the present invention will become apparent from the following detailed description, taken in combination with the appended drawings, in which.

DETAILED DESCRIPTION

Figure 1:
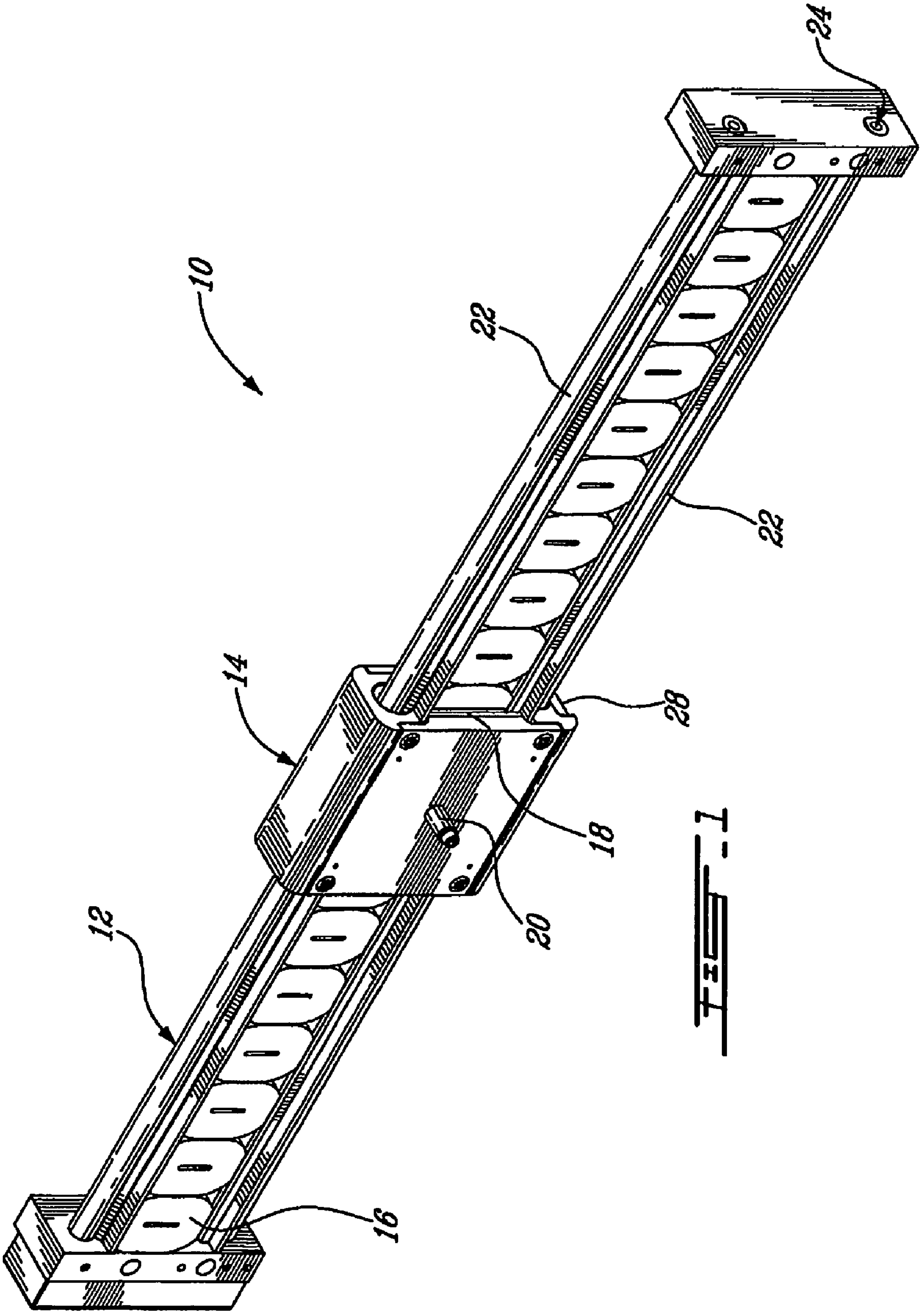
FIG. 1 is a perspective view of a linear motor door actuator according to an embodiment of the invention.
Figure 2:
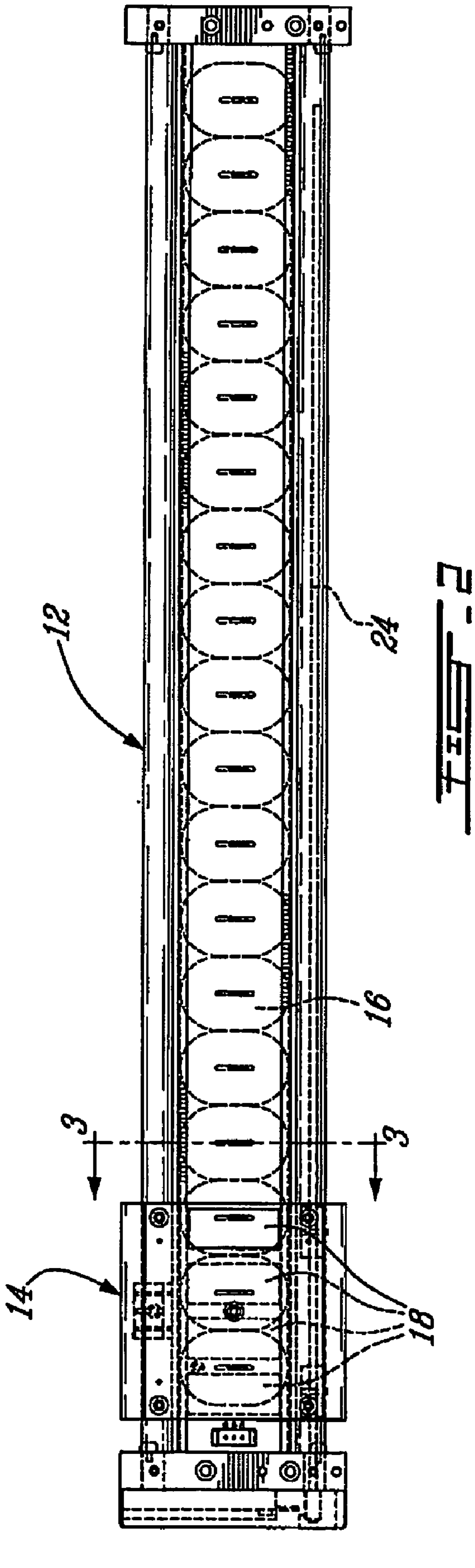
FIG. 2 is an elevation view of the linear motor door actuator of FIG. 1, wherein magnets in the mobile section are shown.
Figure 3:
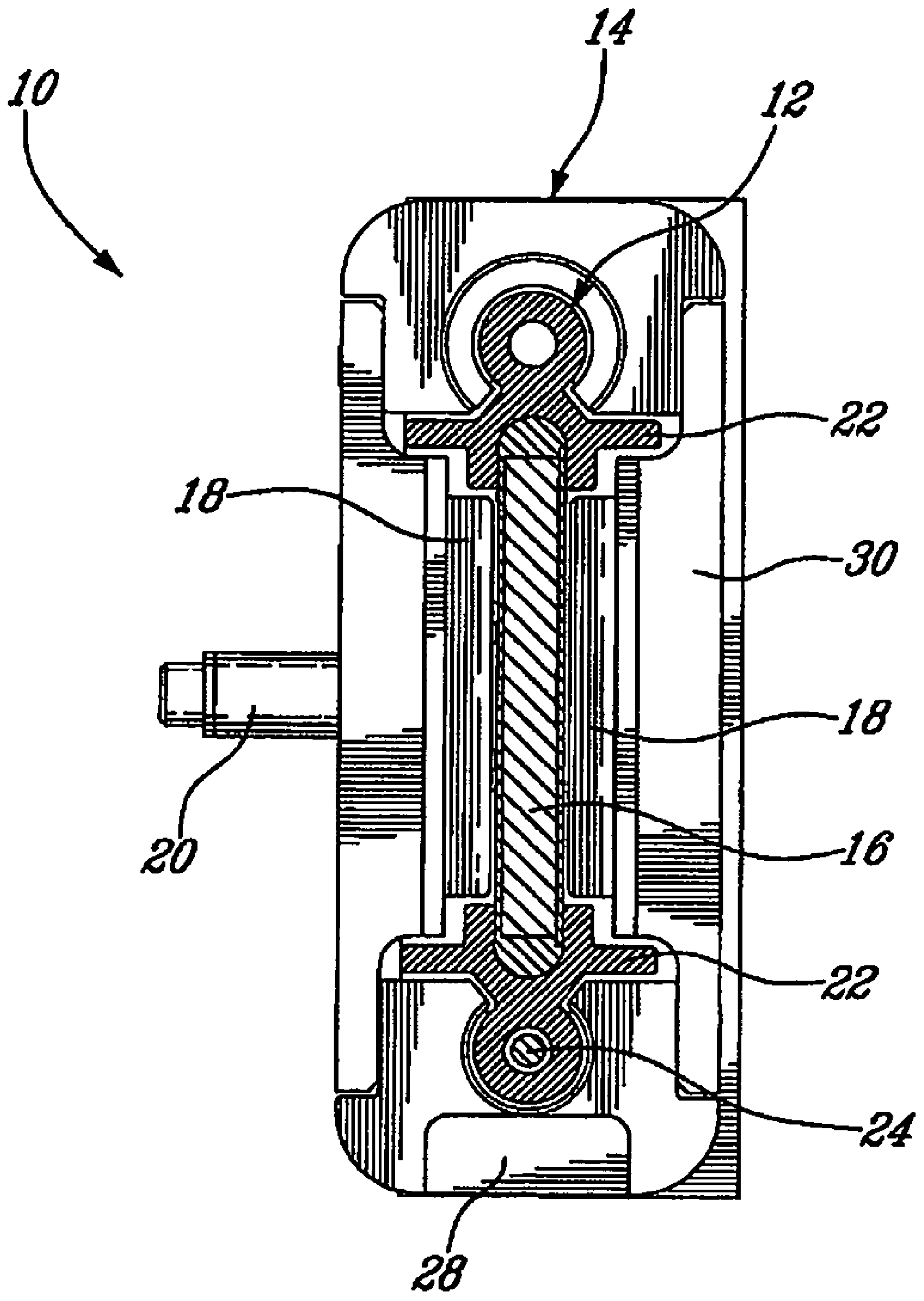
FIG. 3 is a cross-sectional view of the linear motor door actuator, taken along the plane 3-3 of FIG. 2.

FIG. 1 to FIG. 3 illustrate a linear motor door actuator 10 having a fixed section 12 with electrical conductor coils 16 and a mobile section 14 with magnets 18 mounted to the fixed section 12 for relative motion to one another. The mobile section 14 has a mechanical connector 20, a pin for instance, through which a door, a window or any structure to be actuated may be connected to the mobile section 14. The fixed section 12 has rails 22 to guide the mobile section 14 as it moves along the fixed section 12.

The fixed section 12 is composed of coils 16 placed side-by-side, disposed along the motion direction of the actuator 10 and driven with three-phase current. The first coil is connected in series with the fourth, the seventh and the tenth coils and so on by multiple of three, and corresponds to phase A. The coil in position two is connected with the coils in positions five, eight, eleven and so on, and corresponds to phase B, while the coil in position three is connected in series with the coil in position six, nine, twelve and so on, and corresponds to phase C.

As best illustrated in FIG. 2, the mobile section 14 of this embodiment has four pairs of facing magnets 18 (4 of the magnets not shown) disposed along the motion direction of the actuator 10. The two magnets of each pairs being separated by a gap through which passes the coils 16 of the fixed section 12. Polarities of the magnets alternate along the motion direction of the actuator 10 and the magnets of each pair faces with opposite polarities. That is, the magnets 18 of each pair has the same magnetic orientation, i.e. the south side of one magnet faces the north side of the magnet in front, while a north side faces the south side of the facing magnet. On each side of the fixed section 14, the magnets 18 are mounted on a steel plate 30 (see FIG. 3) to contain the magnetic field.

To move the mobile section 14, a three-phase current source powers the three-phase coils 16. The speed of the actuator is controlled by the frequency of the three-phase current. Higher frequencies correspond to higher speeds.

Also shown in FIG. 1 to FIG. 3, a position sensor 24 is enclosed in one of the rails 22 and senses the position of the mobile section 14 with respect to the fixed section 12 using a positioning magnet 28 located on the mobile section 14. As will be discussed later on, the sensed position of the mobile section 14 is used to maintain the phase shift θ between the magnets 18 and the three-phase current in the coils 16 while the actuator 10 is in operation. The amplitude and the frequency of the three-phase current are controlled with feedback of the position sensor 24 in order to minimize power consumption needed to slide the door. Specifically, the amplitude and the frequency of the current in the coils 16 are varied to maintain the phase shift θ between the magnets 18 and the current in the coils 16 to an optimum phase shift value, thereby providing minimum power consumption for proper operation of the actuator 10.

In this embodiment, a Temposonics® LK magnetostriction position sensor 24 is used to sense the position of the mobile section 14 with respect to the fixed section 12 but any other sensor could be alternatively used. Other non contact sensors that could be used includes Hall effect sensors distributed along the fixed section 12. In order to maximize the force produced in the actuator 10, the coils 16 are made from flat wires. With flat wires, coils 16 are easier to make and very little space is needed to connect the center of each coil 16 but any other wires could also be used. The maximum Lorentz force to be generated in the actuator is proportional to the number of coil turns and to the amplitude of the current. The flat wire also maximizes the quantity of copper in the available space. Flat wire in this embodiment provides the lowest resistance for a given number of turns.

The linear motor door actuator 10 is activated by Lorentz force which exerts a force on a charged particle that passes through a magnetic field. In the linear motor door actuator 10, the charged particles corresponds to electrons that pass through the coils 16 and the magnetic field is created by the magnets 18 in the mobile section 14. Since the coils 16 are fixed, the Lorentz force is reflected, in this case, in a translational force on the magnets 18, which provides the translational motion of the mobile section 14 relative to the fixed section 12. The produced mechanical force is transmitted to the door through the mechanical connector 20 attached to the mobile section 14 and to the door. The produced force is a function of the current flowing through the coils 16, the direction of the current and the position of the coils 16 in reference to the magnets 18. In other words, the produced force is a function of the phase shift θ between magnets 18 and the three-phase current in the coils 16.

Figure 4:
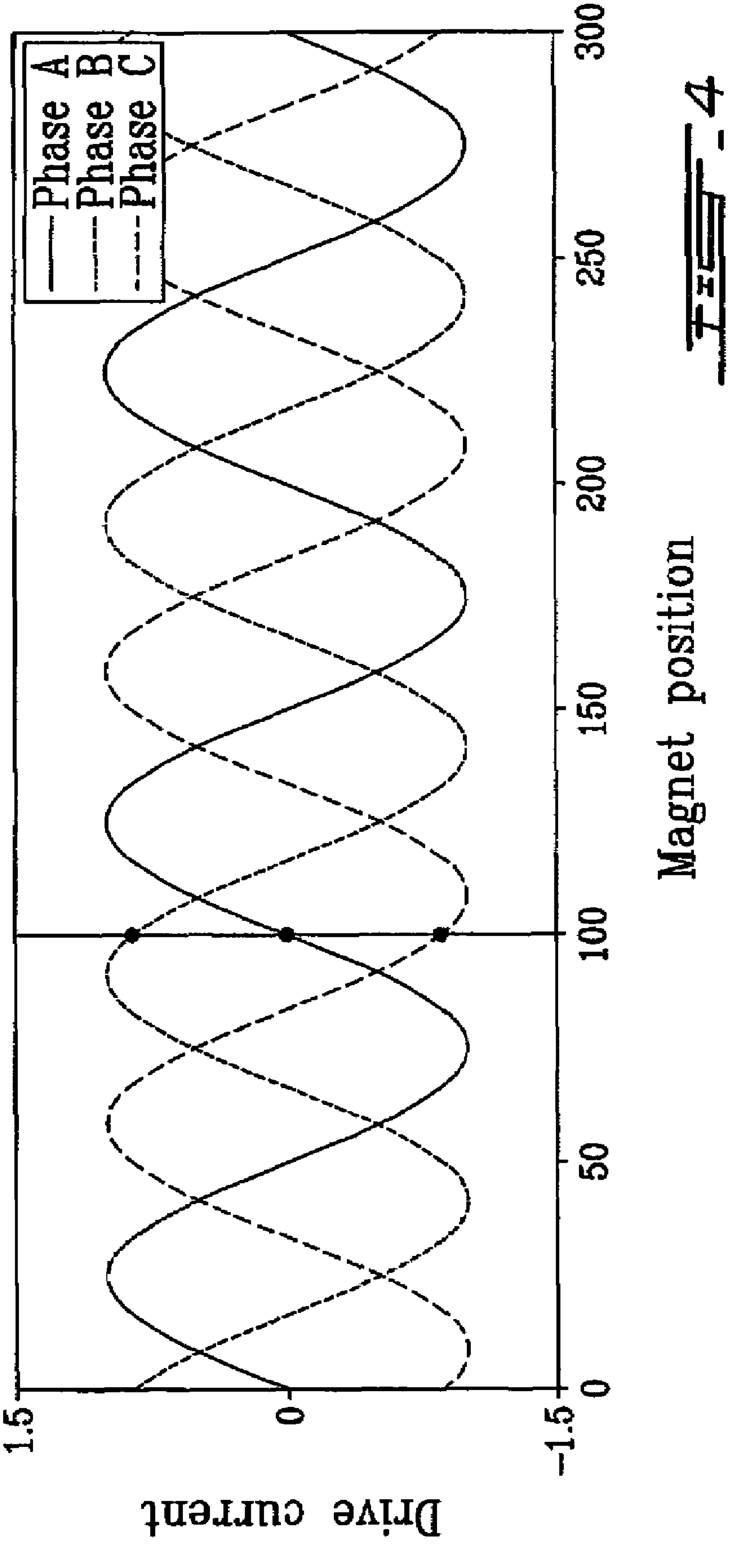
FIG. 4 is a graph showing a relation between the magnets position and the current phase in the coils in the linear motor door actuator of FIG. 1.

The graph of FIG. 4 shows the relation between the position of the magnets 18 with reference to the fixed section 12 and the current in the coils 16 when the Lorentz force is at its minimum, i.e. the position the magnets 18 are attracted to. This position corresponds to a reference phase shift position, i.e. a zero phase shift between the magnets 18 and the current in the coils 16. In this case, a 360° phase shift between the magnets 18 and the current in the coils 16 corresponds to the distance between two consecutive coils 16 to the same electrical phase, e.g. the distance between the first and the fourth coil. As an example, at a position 100 of the magnets 18, the Lorentz force is minimized when the current in electrical phase A is zero, the current in electrical phase B is 86% of the current amplitude and the current in electrical phase C is negative and 86% of the amplitude.

The translational force on the mobile section 14 increases when the phase shift θ increases until it reaches maximum force corresponding to a 90° phase shift. Passed 90°, the force decreases to reach again a minimum when the phase shift θ is 180°. For phase shift a higher than 180°, the direction of the force is inverted. Passed 180°, the force increases to a maximum at 270° and decreases again to a minimum at 360°, which corresponds to 0°.

In this embodiment, the zero phase shift position along with the corresponding position sensed by the position sensor 24 is defined during an initialization procedure of the actuator 10. For this procedure, one arbitrary magnet position is chosen, e.g. position 100. The coils are powered with direct current such that the current intensity ratio between the electrical phases A, B and C corresponds to a minimum Lorentz force at the chosen position, as can be read on graph of FIG. 4. In this case, current in phase A is null and current in phase B and C are of the same intensity, current in phase B being positive and current in phase C being negative. The position of the magnets 18 is then sensed using the position sensor 24 and corresponds to a zero phase shift. In order to minimize the initialization errors, a maximum current is provided to the coils, the current ratio remaining as defined above, and no external force is applied to the actuator 10. In this case, the defined current conditions are applied for about five seconds before the position is sensed.

In order to operate the actuator 10, coils 16 are energized with three-phase current and the mobile section 14 moves along the fixed section 12. The greater is the amplitude of the current, the more external resistance is required to produce a phase shift θ between the magnets 18 and the three-phase coils 16. In order to minimize power consumption of the actuator 10 in operation, the current amplitude must provide just the right amount of power such that the phase shift θ corresponds to the maximum Lorentz force, i.e. the maximum translational force. This optimal phase shift corresponds to 90°.

Figure 5:
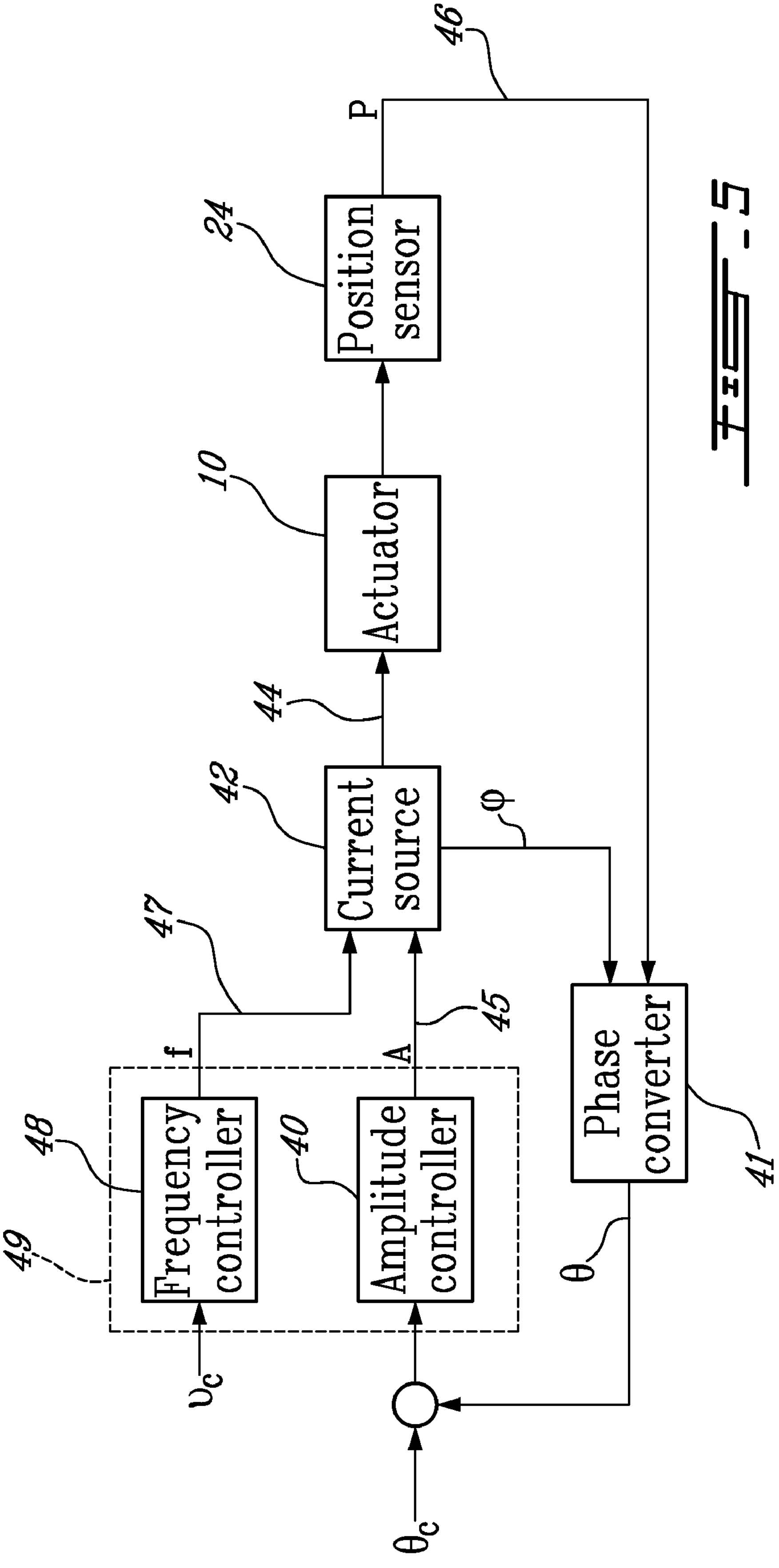
FIG. 5 is a block diagram illustrating a control scheme of the linear motor door actuator of FIG. 1, according to an embodiment of the invention and wherein the current frequency is varied to control the velocity of the motor in an open loop and the current amplitude is varied to control the phase shift between the magnet position and the current in the coils.

Numerous control schemes may be used to carry out the invention. FIG. 5 illustrates a control scheme according to an embodiment of the invention and wherein the frequency of the current in the coils is varied to control the velocity of the motor in a open loop and the amplitude of the current is varied to control the phase shift θ between the magnet position and the current in the coils. According to this embodiment, a current source 42 energizes the coils of the actuator 10 with an alternating current 44, i.e. a three-phase current, having an amplitude, a frequency and a phase ϕ to produce a movement of the mobile section relative to the fixed section. The current source 42 receives an amplitude signal 45 and a frequency signal 47 to vary the amplitude and the frequency of the current 44. The resulting position 46 of the mobile section is sensed using the position sensor 24 and the phase shift θ is determined using the phase converter 41 according to the sensed position 46 and the phase ϕ of the current 44 in the coils. In order to minimize the power consumption of the actuator 10, the phase shift θ is substantially maintained to the phase shift set point $\theta_c$, i.e. the optimum phase shift of 90°, using an amplitude controller 40. The amplitude controller 40 varies the amplitude of the current 44 produced by the current source 42 (by varying the amplitude signal 45), with feedback on the phase shift θ. If the phase shift θ exceeds the set point $\theta_c$ (i.e. 90°), the amplitude of the current is increased and if the phase shift e is lower than the set point $\theta_c$ (i.e. 90°), the amplitude of the current is decreased such that the phase shift θ is substantially maintained to the set point $\theta_c$. The velocity of the actuator 10 is controlled by varying the frequency of the current 44 (by varying the frequency signal 47) using an open loop frequency controller 48, i.e. with no feedback on the actual velocity of the actuator 10. Higher frequencies correspond to higher speeds. The frequency controller 48 can include filtering capabilities such that the frequency of the current 44 does not change abruptly, which could result in a loss of synchronism in the actuator 10. A source controller 49 comprises the frequency controller 48 and the amplitude controller 40.

Figure 6:
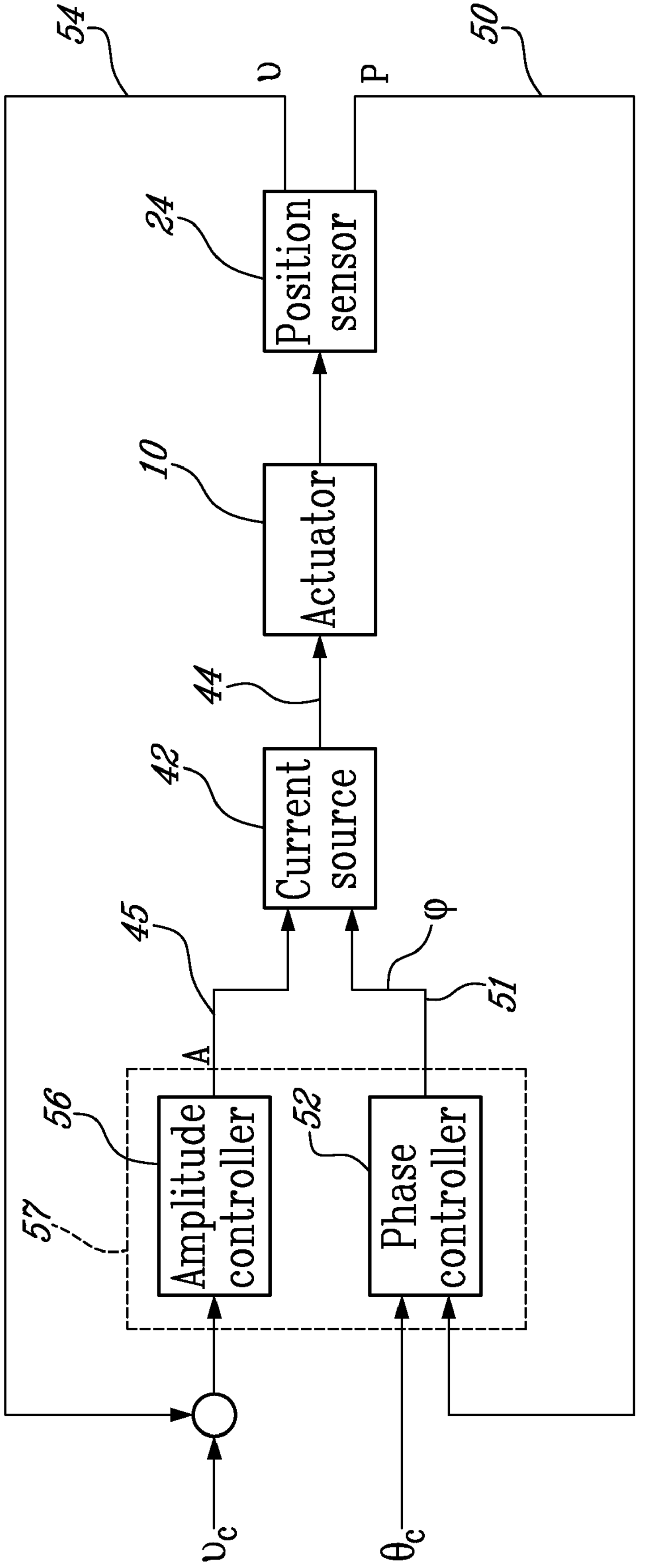
FIG. 6 is a block diagram illustrating a control scheme of the linear motor door actuator of FIG. 1, according to another embodiment of the invention and wherein the current amplitude is varied to control the velocity of the motor and the current phase is varied to control the phase shift between the magnet position and the current in the coils.

FIG. 6 illustrates another possible control scheme. In this embodiment, the amplitude of the current is varied to control the velocity of the motor and the phase ϕ of the current is varied to control the phase shift between the magnet position and the current in the coils. According to this embodiment, a current source 42 energizes the coils of the actuator 10 with a current 44 having an amplitude, a frequency and a phase ϕ. The current source 42 receives an amplitude signal 45 and a phase signal 51 to vary the amplitude and the phase of the current 44. The resulting position 50 and velocity 54 of the mobile section are sensed using the position sensor 24 and the required phase ϕ of the current 44 for maintaining the phase shift θ to the phase shift set point $\theta_c$ (i.e. the optimum phase shift of 90°) is determined using the phase controller 52. The phase controller 52 adjusts the phase of the current 44 to the required phase ϕ by varying the phase signal 51. Each position 50 of the mobile section corresponds to an given current phase ϕ for a given phase shift set point $\theta_c$ (i.e. the optimal phase shift of 90°). The velocity of the actuator 10 is controlled by varying the amplitude of the current 44 (by varying the amplitude signal 45) using an amplitude controller 56 with feedback on the sensed velocity 54. When accelerating the actuator 10, the amplitude controller 56 increases the current amplitude and, consequently, the phase shift θ tends to decrease. In response to the decreased phase shift θ, the phase controller 52 varies the current phase such that the phase shift θ is maintained to the phase shift set point $\theta_c$ (i.e. 90°). When the set point $\theta_c$ is the optimal phase shift of 90°, the force of the actuator 10 is optimized and the current amplitude is minimized for a given instructed velocity. Continuously varying the current phase ϕ actually results in varying the frequency of the current such that higher velocities correspond to higher frequencies. In this control scheme, the current is indirectly varied as a function of the phase shift θ, through feedback on the sensed position 50 and velocity 54, such that a minimum amplitude is provided to follow the instructed velocity. The power consumption of the actuator 10 is thus optimized. A source controller 57 comprises the phase controller 52 and the amplitude controller 56.

Figure 7:
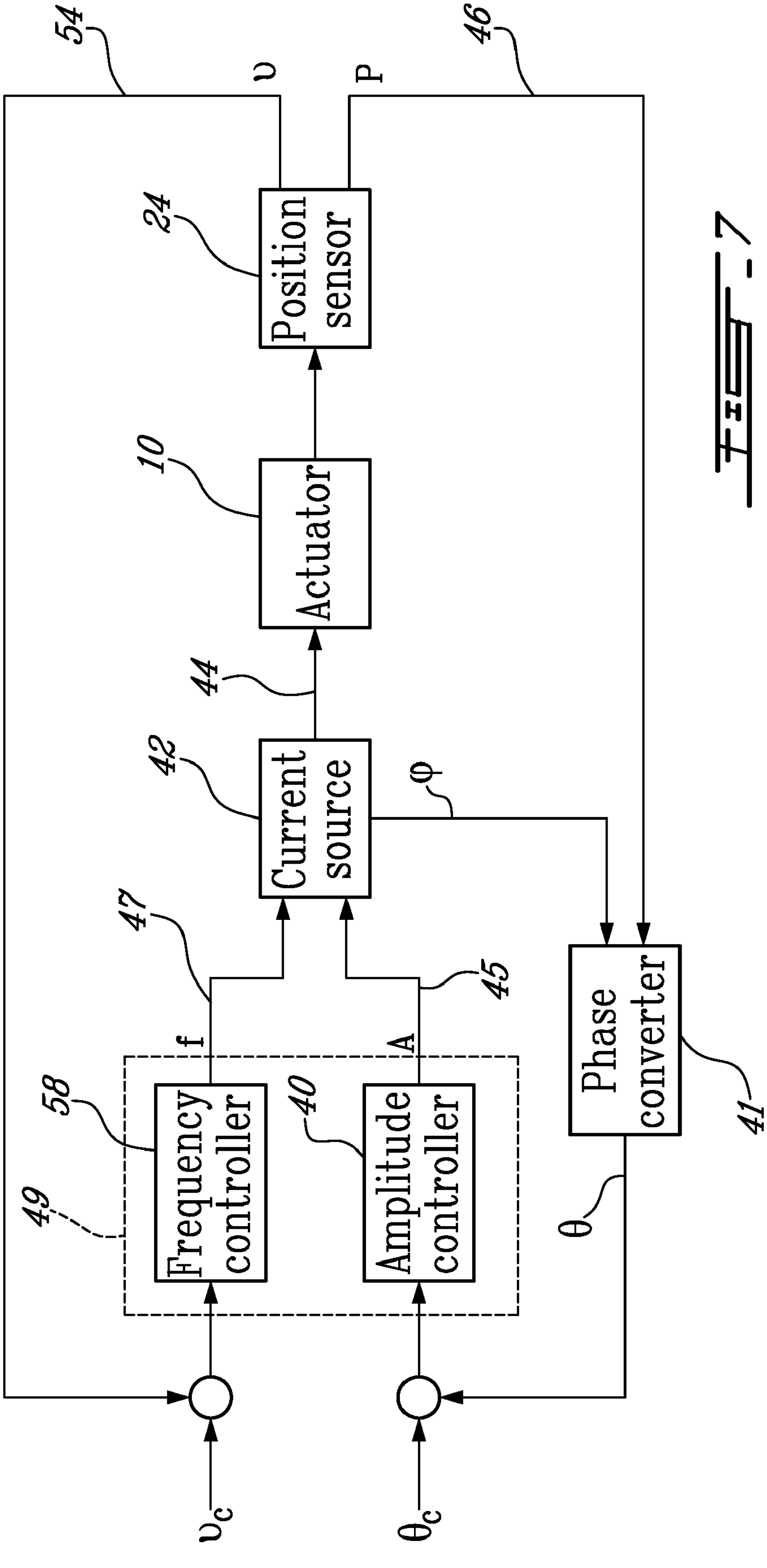
FIG. 7 is a block diagram illustrating a control scheme of the linear motor door actuator of FIG. 1, according to another embodiment of the invention and wherein the current frequency is varied to control the velocity of the motor in a closed loop and the current amplitude is varied to control the phase shift between the magnet position and the current in the coils.

FIG. 7 illustrates another possible control scheme. In this embodiment, the frequency of the current is varied to control the velocity of the motor and the amplitude of the current is varied to control the phase shift θ between the magnet position and the current in the coils. As opposed to the embodiment of FIG. 5, the velocity of the motor is controlled with a feedback loop. According to this embodiment, a current source 42 energizes the coils of the actuator 10 with a current 44 having an amplitude, a frequency and a phase ϕ. The current source 42 receives an amplitude signal 45 and a frequency signal 47 to vary the amplitude and the frequency of the current 44. The resulting position 46 and velocity 54 of the mobile section are sensed using the position sensor 24 and, as in the embodiment of FIG. 5, the phase shift θ is determined using phase converter 41 according to the sensed position 46 and the phase ϕ of the current 44 in the coils. In order to minimize the power consumption of the actuator 10, the phase shift θ is substantially maintained to the phase shift set point $\theta_c$, i.e. the optimum phase shift of 90°, using an amplitude controller 40. The amplitude controller 40 varies the amplitude of the current 44 produced by the current source 42 (by varying the amplitude signal 45) with feedback on the phase shift θ (determined using the sensed position 46 and the phase ϕ). If the phase shift θ exceeds the set point $\theta_c$ (i.e. 90°), the amplitude of the current is increased and if the phase shift θ is lower than the set point $\theta_c$ (i.e. 90°), the amplitude of the current is decreased such that the phase shift θ is substantially maintained to the set point $\theta_c$. The velocity of the actuator 10 is controlled by varying the frequency of the current 44 (by varying the frequency signal 47) using a frequency controller 58 with feedback on the sensed velocity 54 of the actuator 10. The velocity of the actuator 10 is increased by increasing the frequency and it is decreased by decreasing the frequency. The frequency controller 48 can include filtering capabilities such that the frequency of the current 44 does not change abruptly, which could result in a loss of synchronism in the actuator 10. A source controller 49 comprises the frequency controller 58 and the amplitude controller 40.

Figure 8:
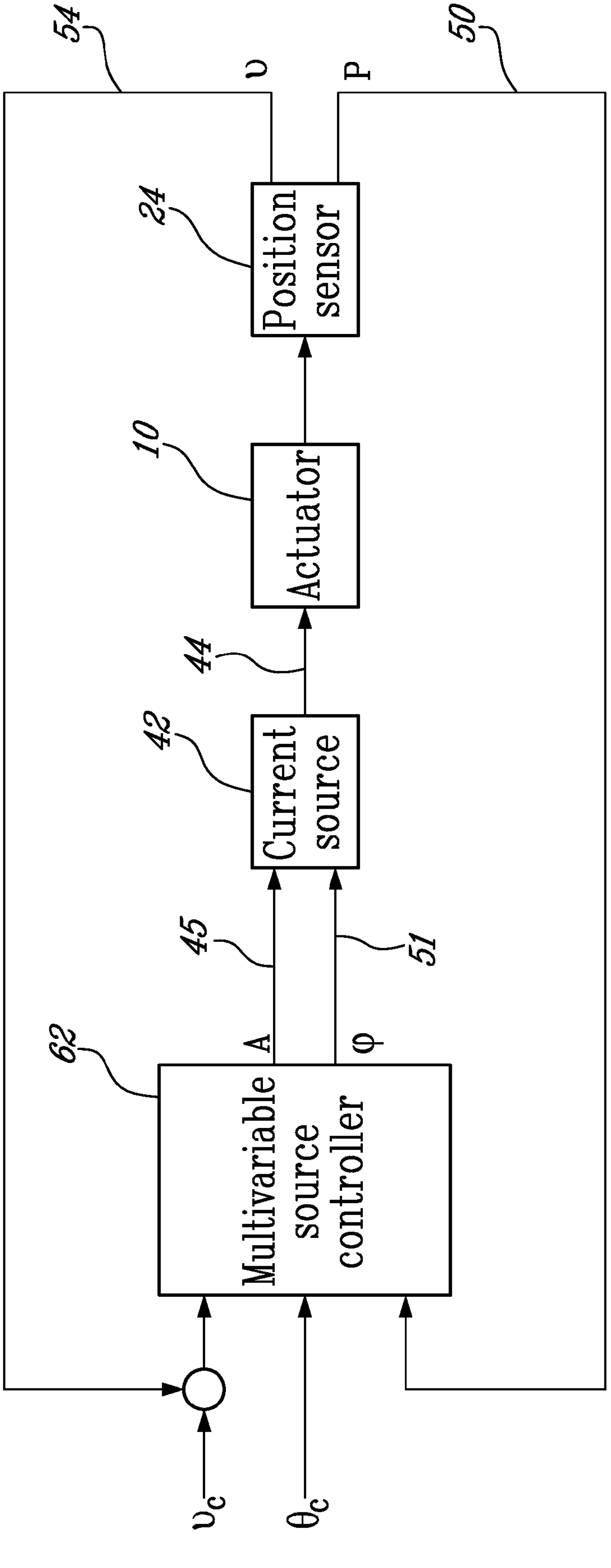
FIG. 8 is a block diagram illustrating a control scheme of the linear motor door actuator of FIG. 1, according to another embodiment of the invention and wherein the current amplitude and the current phase are varied using a multivariable controller, to control the velocity of the motor and the phase shift between the magnet position and the current in the coils.

FIG. 8 illustrates another possible control scheme. In this embodiment, a multivariable source controller is used to vary the phase ϕ and the amplitude of the current for maintaining the phase shift θ to the phase shift set point $\theta_c$ and for controlling the velocity of the actuator 10. According to this embodiment, a current source 42 energizes the coils of the actuator 10 with a current 44 having an amplitude, a frequency and a phase $\phi$. The current source 42 receives an amplitude signal 45 and a phase signal 51 to vary the amplitude and the phase of the current 44. The resulting position 50 and velocity 54 of the mobile section are sensed using the position sensor 24. The multivariable source controller 62 varies the phase and the amplitude of the current 44 (by varying the amplitude signal 45 and the phase signal 51) with feedback on the sensed position 50 and velocity 54, for maintaining the phase shift $\theta$ to the phase shift set point $\theta_c$ (i.e. the optimum phase shift of 90°) and for controlling the velocity of the actuator 10. The phase shift $\theta$ is thus maintained to the phase shift set point $\theta_c$ while the velocity 54 corresponds to the instructed velocity.

In the embodiments depicted in FIG. 5 to FIG. 8, the position of the mobile section is the sensed physical quantity representative of the phase shift $\theta$ between the magnets and the current in the coils because the phase shift $\theta$ is determined according to the sensed position 46 and the phase $\phi$ of the current 44 in the coils. Alternatively, the phase shift $\theta$ may be directly sensed in the actuator 10 and may provide the sensed physical quantity.

Though the present invention is not limited to the integration of this feature, an obstruction of the actuated structure can advantageously be detected. Accordingly, in reference to the control schemes of FIG. 5, FIG. 6, FIG. 7 or FIG. 8, the amplitude of the current is limited to a given limit. If the amplitude of the current reaches this limit when the phase shift $\theta$ exceeds the optimal phase shift of 90°, an obstruction unit (not shown) determine that there is an obstruction of the door, the window or the other actuated structure. In response to an obstruction detection, the direction of movement of the actuator 10 can be reversed in order to release the obstruction. In this specific embodiment, the door reopens, waits a few seconds and closes again. One skilled in the art will understand that other possible actions could occur in response to an obstruction detection.

Figure 9:
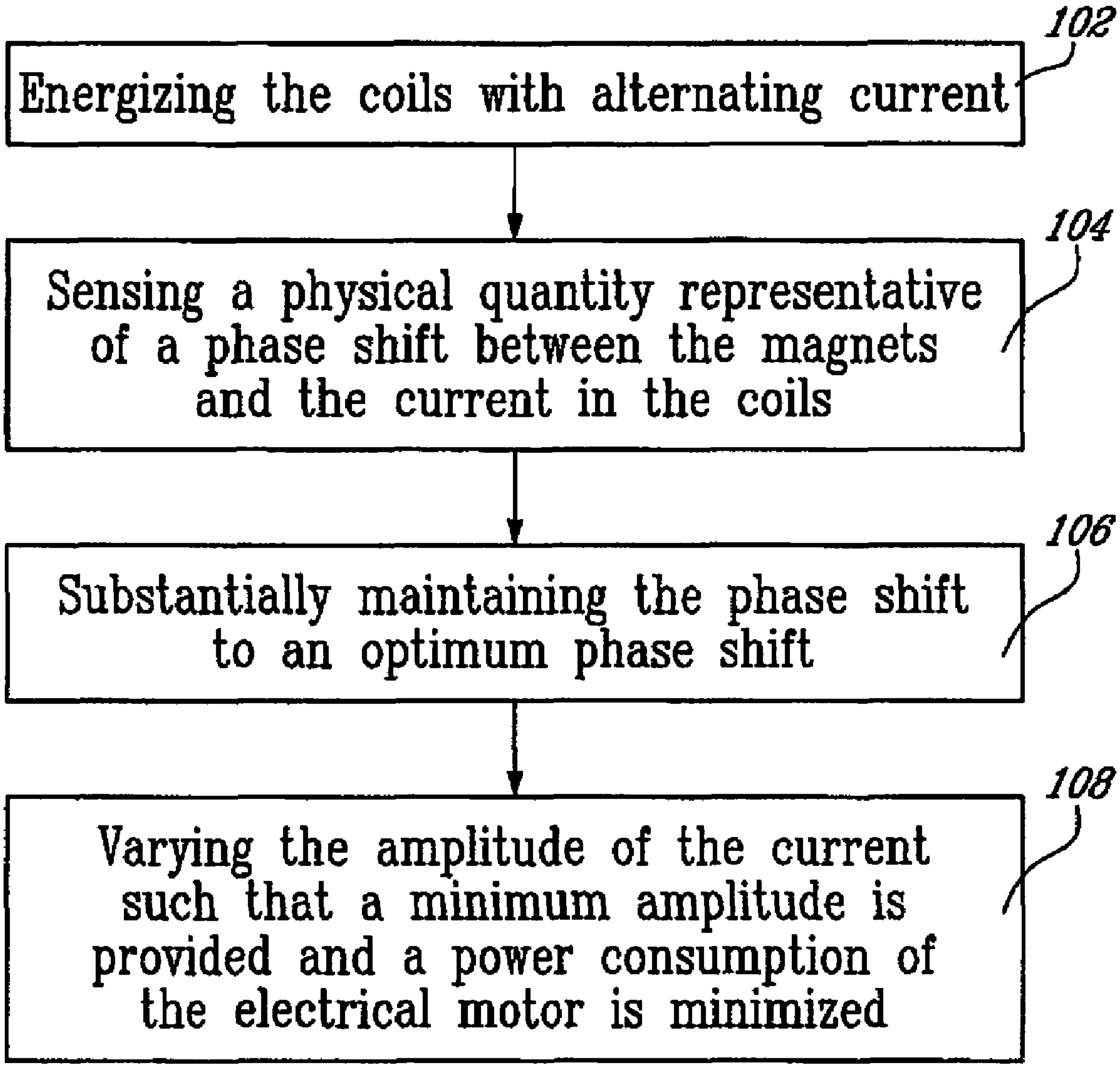
FIG. 9 is a flow chart illustrating a method of controlling an alternating current electric motor, e.g. the linear motor door actuator of FIG. 1, for minimizing its power consumption.

FIG. 9 illustrates a method of controlling an electrical motor, e.g. the alternator, for minimizing its power consumption. In step 102, the coils are energized with an alternating current, e.g. three-phase current, to produce a movement of the mobile section and the fixed section relative to one another. In step 104, a physical quantity is sensed in the motor. The physical quantity is representative of a phase shift $\theta$ between the magnets and the current in the coils. Examples of suitable physical quantities are the position of the mobile section relative to the fixed section and the phase shift $\theta$ between the magnets and the current in the coils. In step 106, the phase shift $\theta$ is substantially maintained to an optimum phase shift, e.g. 90°. Finally, in step 108, the amplitude of the current is varied such that a minimum amplitude is provided and a power consumption of the motor is minimized. Furthermore, in one embodiment, a velocity set point is received and the velocity of the motor is sensed. The amplitude of the current is varied to control the velocity according to the velocity set point and the phase shift $\theta$ is maintained by varying the phase of the current.

Figure 10:
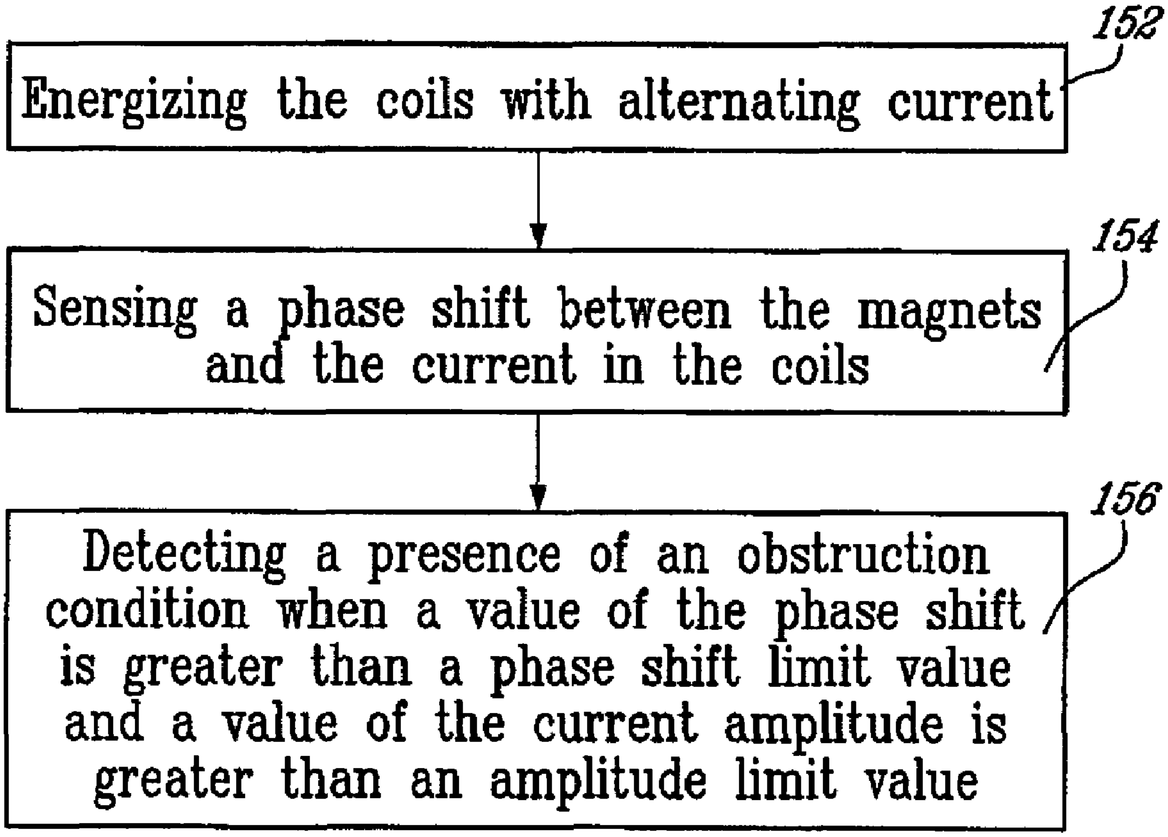
FIG. 10 is a flow chart illustrating a method for detecting an obstruction in an alternating current electrical motor, e.g. the linear motor door actuator of FIG. 1.

FIG. 10 illustrates a method for detecting an obstruction in an electrical motor, e.g. the actuator. In step 152, the coils are energized with alternating current to produce a movement of the mobile section and the fixed section relative to one another. In step 154, a phase shift between the magnets and the current in the coils 16 is sensed. Finally, in step 156, a presence of an obstruction condition is detected when a value of the phase shift is greater than a phase shift limit value and a value of the current amplitude is greater than an amplitude limit value.

One skilled in the art will understand that the presently described embodiments do not limit the invention to linear motor door activators. The presented teachings could be applied as well to a rotary motor having a rotor with permanent magnets and a stator with electrical conductor coils. The electrical motor could alternatively be used to actuate a turntable used for industrial applications for example, or for driving a vehicle.

While in the some of the presented embodiments, the coils are powered with three-phase current, it should be appreciated that the present invention could be applied as well to a single phase motor or to any multiple phase motor. An alternating current may be a single phase current or a multiple phase current.

The embodiments of the invention described above are intended to be exemplary only. The scope of the invention is therefore intended to be limited solely by the scope of the appended claims.

The invention claimed is:

1. A method of controlling an electrical motor for minimizing its power consumption, the motor having a first element with magnets of alternating polarities, and a second element with electrical conductor coils, said first and said second elements being mounted for relative motion to one another, said method comprising the steps of:

- energizing said coils with an alternating current to produce a movement of said first and said second elements relative to one another, said alternating current having an amplitude, a frequency and a phase;
- sensing a physical quantity representative of a phase shift between said magnets and said current in said coils;
- substantially maintaining said phase shift to an optimum phase shift by varying at least one of said amplitude, said frequency and said phase; and
- varying said amplitude such that said amplitude and thereby a power consumption of said electrical motor are minimized.

2. The method as claimed in claim 1, further comprising receiving a velocity instruction and wherein said amplitude is varied such that said amplitude is minimized while complying with said velocity instruction.

3. The method as claimed in claim 1, wherein

- said physical quantity comprises a position of said first element relative to said second element and
- said maintaining comprises varying said phase as a function of the sensed position; and
- the method further comprising receiving a velocity set point, sensing a velocity of said motor and controlling said velocity according to said velocity set point by said varying said amplitude.

4. The method as claimed in claim 1, further comprising defining a reference phase shift corresponding to the sensed phase shift when a Lorentz force is minimum, said value of said phase shift being defined in reference to said reference phase shift.

5. The method as claimed in claim 4, wherein said defining comprises sensing said reference phase shift while said coils are energized with direct current corresponding to one instant in said energizing alternating current.

6. The method as claimed in claim 4, wherein a value of said optimum phase shift is a ninety-degree phase shift relative to said reference phase shift.

7. The method as claimed in claim 1, further comprising determining the presence of an obstruction condition of said motor when a value of said phase shift is greater than a value of said optimum phase shift and a value of said amplitude is greater than an amplitude limit value.

8. The method as claimed in claim 7, further comprising reversing a direction of movement of said motor in order to release said obstruction when said obstruction condition is present.

9. An electrical motor controller for minimizing power consumption in an electrical motor having a first element with magnets of alternating polarities, and a second element with electrical conductor coils, said first and said second elements being mounted for relative motion to one another, said controller comprising:

a current source for energizing said coils with an alternating current to produce a movement of said first and said second elements relative to one another, said alternating current having an amplitude, a frequency and a phase;

a sensor for sensing a physical quantity representative of a phase shift between said magnets and said current in said coils; and a current source controller for substantially maintaining said phase shift to an optimum phase shift, said current source controller having an amplitude controller for varying said amplitude such that said amplitude is minimized.

10. The electrical motor controller as claimed in claim 9, wherein said current source controller further comprises an input for receiving a velocity instruction, said amplitude being varied such that said amplitude is minimized while complying with said velocity instruction.

11. The electrical motor controller as claimed in claim 9, wherein maintaining said phase shift is made by varying at least one of said amplitude, said frequency and said phase.

12. The electrical motor controller as claimed in claim 9, wherein said physical quantity comprises a position of said first element relative to said second element, said electrical motor controller further a velocity sensor for sensing a velocity of said motor, said current source controller further has a phase controller for varying said phase as a function of the sensed position, and said amplitude controller comprises an input for receiving a velocity set point and a velocity controller for controlling said velocity according to said velocity set point by varying said amplitude.

13. The electrical motor controller as claimed in claim 9, wherein said current source controller further comprises an obstruction unit for determining the presence of an obstruction condition of said motor when a value of said phase shift is greater than said optimum phase shift value and a value of said amplitude is greater than an amplitude limit value.

14. The electrical motor controller as claimed in claim 9, wherein a value of said phase shift is defined according to a reference phase corresponding to the sensed phase shift when the motor is in a steady position.

15. The electrical motor controller as claimed in claim 14, wherein said reference phase shift is the sensed phase shift when said coils are energized with direct current.

16. The electrical motor controller as claimed in claim 14, wherein a value of said optimum phase shift is ninety degrees.

17. The alternating current electrical motor as claimed in claim 9, wherein said current source is a three-phase source.

18. An alternating current electrical motor with reduced power consumption and having a motion direction, said motor comprising:

a first element having magnets disposed with alternating polarities along said motion direction;

a second element mounted to said first element for relative motion to one another and having electrical conductor coils disposed along said motion direction;

a current source for energizing said coils with an alternating current to produce a movement of said first and said second elements relative to one another, said alternating current having a phase, a frequency and a variable amplitude;

a sensor for sensing a physical quantity representative of a phase shift between said magnets and said current in said coils; and a current source controller for substantially maintaining said phase shift to an optimum phase shift, said current source controller having an amplitude controller for varying said amplitude such that said amplitude is minimized.

19. The alternating current electrical motor as claimed in claim 18, wherein said current source controller further comprises an input for receiving a velocity instruction, said amplitude being varied such that said amplitude is minimized while complying with said velocity instruction.

20. The alternating current electrical motor as claimed in claim 18, wherein maintaining said phase shift is made by varying at least one of said amplitude, said frequency and said phase.

21. The alternating current electrical motor as claimed in claim 18, further comprising a velocity sensor for sensing a velocity of said motor and wherein said current source controller further has an input for receiving a velocity set point and said amplitude and said phase are varied for maintaining said phase shift and for controlling said velocity according to said velocity set point.

22. The alternating current electrical motor as claimed in claim 18, wherein said current source controller is further for determining the presence of an obstruction condition of said motor when a value of said phase shift is greater than a value of said optimum phase shift and a value of said amplitude is greater than an amplitude limit value.

23. The alternating current electrical motor as claimed in claim 18, wherein said phase shift is defined according to a reference phase shift corresponding to the sensed phase shift when the motor is in a steady position, a value of said phase shift being defined in reference to said reference phase shift.

24. The alternating current electrical motor as claimed in claim 23, wherein said reference phase shift is the sensed phase shift when said coils are energized with direct current.

25. The alternating current electrical motor as claimed in claim 23, wherein a value of said optimum phase shift ninety degrees.

26. The alternating current electrical motor as claimed in claim 18, wherein said current source is a three-phase source.

27. A method for detecting an obstruction in an electrical motor, the motor having a first element with magnets of alternating polarities, and a second element with electrical conductor coils, said first and said second elements being mounted for relative motion to one another, said method comprising the steps of:

energizing said coils with an alternating current to produce a movement of said first and said second elements relative to one another, said alternating current having an amplitude;

sensing a physical quantity representative of a phase shift between said magnets and said current in said coils; and detecting a presence of an obstruction condition when a value of said phase shift is greater than a phase shift limit value and a value of said amplitude is greater than an amplitude limit value.

28. The method as claimed in claim 27, further comprising defining a reference phase shift corresponding to the sensed phase shift when a Lorentz force is minimum, said value of said phase shift being defined in reference to said reference phase shift.

29. The method as claimed in claim 28, wherein said phase shift limit value is ninety degrees.

30. The method as claimed in claim 27, further comprising reversing a direction of movement of said motor in order to release said obstruction when said obstruction condition is present.

* * * * *

UNITED STATES PATENT AND TRADEMARK OFFICE

CERTIFICATE OF CORRECTION

PATENT NO. : 7,626,348 B2
APPLICATION NO. : 11/442251
DATED : December 1, 2009
INVENTOR(S) : Cartier et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 855 days.

Signed and Sealed this

Second Day of November, 2010

David J. Kappos

*Director of the United States Patent and Trademark Office*